Jan. 30, 1934.　　　　C. W. MARSH　　　　1,945,153
PISTON
Original Filed June 1, 1931
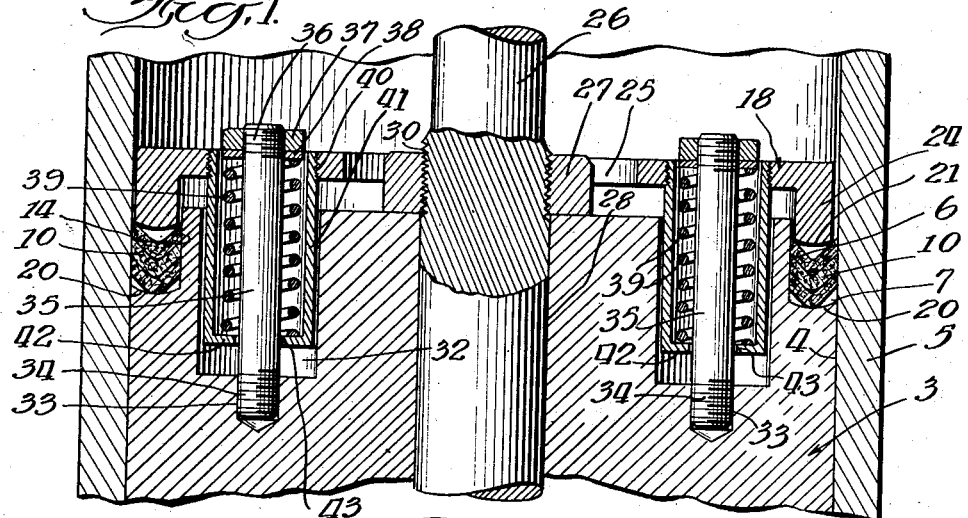
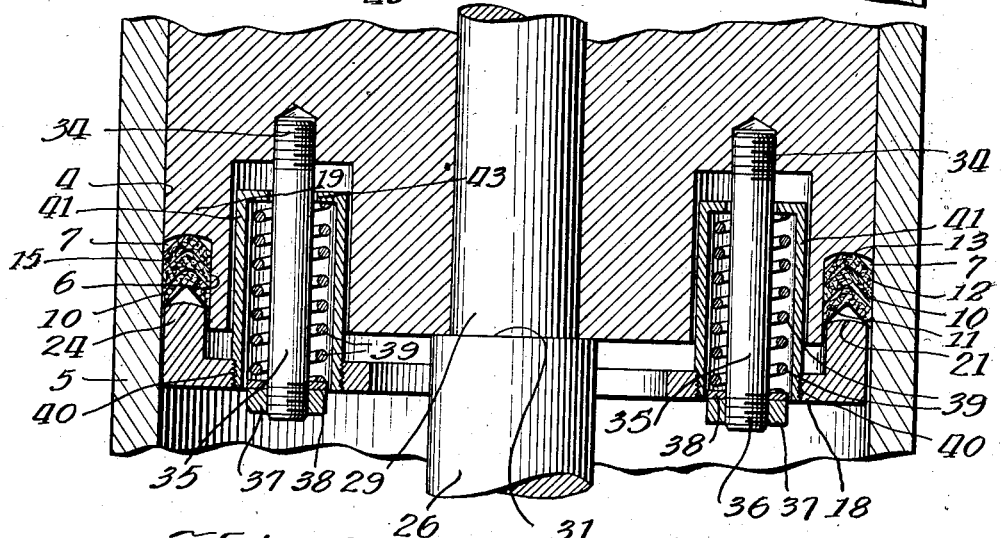
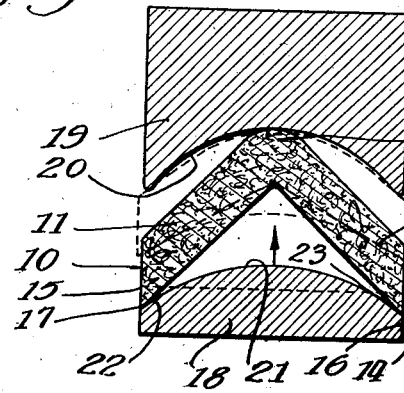
Inventor
Charles W. Marsh
By Williams, Bradbury,
McCaul & Hinkle
Attys.

Patented Jan. 30, 1934

1,945,153

UNITED STATES PATENT OFFICE 1,945,153

PISTON

Charles W. Marsh, Muskegon, Mich.

Original application June 1, 1931, Serial No. 541,301. Divided and this application June 6, 1932. Serial No. 615,635

6 Claims. (Cl. 309—34)

The present invention relates to pistons, and is particularly concerned with pistons of the type adapted to be employed in a cylinder for use in pumps, air compressors, hydraulic rams, air hoists, air chucks, railway air brakes, automobile brakes, door checks and myriad other uses.

One of the objects of the invention is the provision of an improved cylinder and piston arrangement in which the piston is adapted to run idle without excessive pressure or wear on the packing devices employed with the piston.

Another object is the provision of an improved piston in which the expansion of the packing devices is controlled and regulated by the amount of fluid pressure acting upon the piston, so that compensation is made for the increased tendency to leak past the packings under high pressure.

Another object is the provision of a piston of the class described, in which all of the moving parts are suitably arranged to prevent leakage of any kind past the pistons under low pressures or high pressures, and which is adapted to maintain a constant pressure without substantial leakage, for long periods of time.

Another object is the provision of a piston of the class described, which may be constructed either as a single acting or double acting piston, and which is adapted to prevent the building up of a pressure behind the packings, such as might tend to offset the compensating action of the high fluid pressure in the cylinder.

Another object is the provision of an improved piston of the class described, which is capable of long and continuous service without necessity for repacking.

Another object is the provision of a high pressure packing which is particularly adapted to be used in hydraulic machinery under extremely high pressures, and which will operate efficiently under such pressures for an extremely long life.

The present application is a division of my parent application, Serial No. 541,301, filed June 1, 1931, on Pistons, and relates particularly to one of the embodiments disclosed in Fig. 2 of said parent application.

Another object is the provision of an improved double acting piston which is adapted to maintain a fluid-tight joint for a long period of time under the most adverse conditions without necessity for repacking the piston.

Other objects and advantages of the invention will be apparent from the following description and from the accompanying drawing, in which similar characters of reference indicate similar parts throughout the several views.

Referring to the single sheet of drawing,

Fig. 1 is a sectional view taken on a plane passing through the axis of the cylinder and piston;

Fig. 2 is a diagrammatic sectional view taken through one of the packings, its seat and its expander, showing the expanding action which takes place in the packing.

Referring to Fig. 1, the piston, which is indicated in its entirety by the numeral 3, is provided with an external cylindrical surface 4 for slidably engaging the interior cylindrical wall of the cylinder 5. Either or both ends of the piston 3 are provided with cylindrical portions 6 of reduced diameter, depending on whether the piston is a single acting or a double acting piston. This forms an annular space 7 between the reduced end 6 and the wall of the cylinder, which is filled with a plurality of V-shaped leather packings 10 nesting in each other and engaging the cylindrical surface 6 and the inner wall of the cylinder.

The packings which are employed may consist of closed rings or molded leather members having a substantially V-shaped cross section, as shown in detail in Fig. 2. While closed leather rings are preferred, for the reason that there is less possibility of leakage than where a split ring is employed, split rings formed of strips of the same material, of V-shaped cross section, with the ends of the strip in abutting relation, may also be utilized where a plurality of packings are employed, and in such case the joints in the respective rings are preferably staggered with respect to each other.

The packing rings, indicated by the numeral 10, may also be arranged in the form of a helix, of which the separate turns constitute the various rings, but in such case the expander and seat should be formed of a shape complementary to the ends of a helix of packing of this type, in order that the expander and seat may come into engagement with the packing about the full periphery of the piston.

The packing rings 10 are preferably provided with a pair of frusto-conical flanges 11 and 12 joined together at the apex 13 along the line of a circle, forming packing of substantially V shape.

A helical strip of V-shaped packing may also be employed with expanders of the type illustrated, provided the ends of the helix are beveled off very gradually to a sharp point so that there is no offset at the end of the helix.

The edges 14 and 15 of the packing are preferably beveled to form substantially sharp edges or lips 16, 17, the edges 14 and 15 being substantially cylindrical in shape and concentric with each other. When a number of turns or rings of V-shaped packing are employed, the packings are nested in each other, as shown in Fig. 1, the inside of each lower packing engaging the outside of the next adjacent packing. Each ring of packing is thus supported by the adjacent rings of packing, and all of the rings are expanded together at the same time.

The packings are preferably actuated by one of a pair of members 18, 19 located above and below the packings, and the member 19 preferably comprises a metallic ring which is adapted to fit about the piston and which is provided with a concave surface 20 for engaging the apex 13 of the packing. In the present instance the member 18 moves toward the fixed member 19, actuating and expanding the packing.

The concave annular groove 20 is of less depth than the altitude of the V-shaped section of the ring, so that the expansion member 19 initially engages the apex 13 of the packing and through the inter-engagement of the successive layers of packing is adapted to support the apices in predetermined position as the flanges are forced upward.

The expansion member 18 is preferably provided with a convex packing engaging surface 21, which is of less height than the altitude of the V-shaped section of one of the packing rings, so that the convex surface of the metal expansion ring initially engages the lower inside edges 22, 23 of the adjacent packing ring. Through the inter-engagement of the packing ring 10 with the other packing rings, the inner expansion member 18 is adapted to force outward all of the outer edges of the packing rings which are nested together.

Referring to Fig. 2, this is a diagrammatic illustration of the expanding action of the members 18 and 19 on the packing rings, and, while a single packing ring is illustrated in Fig. 2 for the purpose of clarity, the action is the same when a plurality of packing rings are employed, and the packing rings are nested together, as shown in Fig. 1.

The full line illustration of the packing 10 shows the ring and the expansion member before pressure is applied to the members 18, 19. As soon as pressure is applied to effect a relative movement of the expansion members and seat, such as the movement of the lower expansion ring in the direction of the arrow, the apex 13 is forced toward the sharp edges 16 and 17. Since the width of the flanges 11, 12 is greater than the space between the opposite edges 14 and 15, the packing is expanded edgewise to the position shown in the dotted lines in Fig. 2.

The concavely curved surface 20 of the seat member 19 and the convexly curved surface 21 of the expansion ring 18 are preferably such that when the packing is fully expanded the expansion rings engage and reinforce the V-shaped leather packing to hold it in predetermined position and prevent the packing from any bending action under the influence of the frictional engagement between the packing and the wall of the piston. The rings are thus prevented from slithering back and forth where the packing is employed in a reciprocating member, but are adapted to take up the wear and maintain a fluid-tight joint at all times.

Referring again to Fig. 1, the annular shoulder 20 on the piston 3 constitutes the packing seat member 19 for the packing rings 10. The piston is also preferably provided with an upper expander 18 having the convexly curved annular surface 21 for engaging inside the flanges of the packing adjacent the edges of the upper packing ring. The expander 18 may consist of a circular metal plate which is provided with a depending cylindrical flange 24 having the convexly curved surface 21. The expander 18 is smaller than the piston 3 so that it does not come into engagement with the walls of the cylinder, and the expander 18 is provided with a centrally located enlarged aperture 25 for passing the piston rod 26 and its securing nut 27. The piston is provided with an axially extending bore 28 for receiving the reduced end 29 of the piston rod 26, and the piston may be secured between the nut 27 on the threaded portion 30 and the annular shoulder 31.

The expander 18 is preferably provided with means for placing the expander under a predetermined pressure so that the V-shaped packings 10 will be subjected to some initial pressure to keep them in engagement with the walls of the cylinder. This initial pressure is not sufficiently great to produce much wear on the packing so that the piston can idle without much wear on the packing, but the pressure is sufficient to keep the packings in proper engagement with the cylinder walls so that an increase of pressure on the working side of the piston will tend to force the packing flanges into firmer engagement with the surface 6 and the wall of the piston 5.

The piston is preferably provided with a plurality of symmetrically located bores 32 extending axially into the end of the piston and located at regularly spaced points, preferably at the same distance from the axis of the piston. Each of the bores 31 may be provided with a smaller threaded bore 33 for receiving the threaded end 34 of a stud bolt 35. The upper end of the stud bolt 35 is threaded at 36 to be received in a pair of threaded nuts 37, 38, each forming a seat for the upper end of the compression spring 39.

The expander 18 is provided with a plurality of threaded bores 40 registering with the bores 32, and each of the bores 40 is provided with tubular metal members 41, the threaded ends of which are threaded into the bores 40. The opposite ends of the tubular metal members 41 are provided with inwardly extending flanges 42, forming seats for the other ends of the compression springs 39. The end 42 of the tubular member 41 is provided with an enlarged bore 43 for passing the stud 35. The compression springs 39 tend to urge the tubular members 41 and the expander 18 downward at the top of Fig. 1 thereby maintaining the convex expander surface 21 in engagement with the inside of the packing flanges.

This tends to force the flanges outward, and the engagement of the apex of the packing with the shoulder 20 tends to change the angularity of the packing so that the flanges of the packing are fed edgewise. Since the springs 39 are arranged symmetrically about the piston, all parts of the expander 18 are subjected to substantially the same pressure, and there is no tendency on the part of the expander to tilt.

In the case of a double acting piston, the other end of the piston may be constructed in a manner similar to the end of the piston just described.

It will thus be observed that I have invented an improved double acting piston in which the sealing action of the packings is increased by the pressure in the cylinder in which the piston is mounted, and the present pistons are capable of maintaining high pressures without leakage for long periods of time without any necessity for repacking the piston. The piston may idle without excessive wear on the packing, by virtue of the improved construction and arrangement of the parts of the piston and packing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A piston comprising a body having a substantially cylindrical outer surface, one end of said body being reduced in size and formed with an annular shoulder, said shoulder being concavely formed to provide a seating surface, with a plurality of layers of substantially V-shaped leather packings about said reduced end, and having the apex of the end packing engaging said concave surface, an expander, comprising an annular member having a convex annular surface for initially engaging the inside of the flanges of the end V packing, said annular member being movably mounted to be actuated by increased fluid pressure on the end of the piston, to expand all of said V-shaped packings, and a plurality of studs fixedly mounted on said piston and slidably engaged by said expander.

2. A piston comprising a body having a substantially cylindrical outer surface, one end of said body being reduced in size and formed with an annular shoulder, said shoulder being concavely formed to provide a seating surface, with a plurality of layers of substantially V-shaped leather packings about said reduced end, and having the apex of the end packing engaging said concave surface, an expander, comprising an annular member having a convex annular surface for initially engaging the inside of the flanges of the end V packing, said annular member being movably mounted to be actuated by increased fluid pressure on the end of the piston, to expand all of said V-shaped packings, and a plurality of studs fixedly mounted on said piston and slidably engaged by said expander, said piston having counterbores about said studs, sleeves on the expander about said studs in said counterbore, and springs compressed between the ends of the sleeves and the expander.

3. A double acting piston comprising a cylindrical body formed with a reduced cylindrical portion at each end, a pair of oppositely directed annular packing seats located at each end of said piston, said packing seats being concavely curved, a plurality of V-shaped packings nesting in each other and having their inner edges in engagement with the reduced cylindrical portions of said piston and their outer edges located to engage the walls of a piston, and a pair of oppositely directed expanders, one located at each end of said piston, said expanders each having annular convexly curved expanding surfaces adapted to engage inside the flanges of said V-shaped packings adjacent the edges of said packings, whereby said V-shaped packings are expanded edgewise into engagement with the adjacent metal parts.

4. A double acting piston comprising a cylindrical body formed with a reduced cylindrical portion at each end, a pair of oppositely directed annular packing seats located at each end of said piston, said packing seats being concavely curved, a plurality of V-shaped packings nesting in each other and having their inner edges in engagement with the reduced cylindrical portions of said piston and their outer edges located to engage the walls of a piston, a pair of oppositely directed expanders, one located at each end of said piston, said expanders each having annular convexly curved expanding surfaces adapted to engage inside the flanges of said V-shaped packings adjacent the edges of said packings, whereby said V-shaped packings are expanded edgewise into engagement with the adjacent metal parts, and resilient means acting upon each of said expanders for placing said expanders and packing under predetermined tension and for taking up the wear in said packing.

5. A double acting piston comprising a cylindrical body formed with a reduced cylindrical portion at each end, a pair of oppositely directed annular packing seats located at each end of said piston, said packing seats being concavely curved, a plurality of V-shaped packings nesting in each other and having their inner edges in engagement with the reduced cylindrical portions of said piston and their outer edges located to engage the walls of a piston, a pair of oppositely directed expanders, one located at each end of said piston, said expanders each having annular convexly curved expanding surfaces adapted to engage inside the flanges of said V-shaped packings adjacent the edges of said packings, whereby said V-shaped packings are expanded edgewise into engagement with the adjacent metal parts, and resilient means acting upon each of said expanders for placing said expanders and packing under predetermined tension and for taking up the wear in said packing, said resilient means comprising a plurality of symmetrically located compression springs, studs carried by said cylinder and located in said springs, said springs being compressed between a seat carried by said stud and a part carried by said expander.

6. A double acting piston comprising a cylindrical body formed with a reduced cylindrical portion at each end, a pair of oppositely directed annular packing seats located at each end of said piston, said packing seats being concavely curved, a plurality of V-shaped packings nesting in each other and having their inner edges in engagement with the reduced cylindrical portions of said piston and their outer edges located to engage the walls of a piston, a pair of oppositely directed expanders, one located at each end of said piston, said expanders each having annular convexly curved expanding surfaces adapted to engage inside the flanges of said V-shaped packings adjacent the edges of said packings, whereby said V-shaped packings are expanded edgewise into engagement with the adjacent metal parts, resilient means acting upon each of said expanders for placing said expanders and packing under predetermined tension and for taking up the wear in said packing, said resilient means comprising a plurality of symmetrically located compression springs, studs carried by said cylinder and located in said springs, a seat carried by said studs, and a flange carried by tubular metal members on said expander, said tubular metal members being located in counterbores in said pistons surrounding said studs.

CHARLES W. MARSH.